(12) United States Patent
Chang et al.

(10) Patent No.: US 9,544,123 B2
(45) Date of Patent: Jan. 10, 2017

(54) ELECTRONIC DEVICE AND NOISE-CANCELLATION METHOD

(71) Applicant: Wistron NeWeb Corp., Hsinchu (TW)

(72) Inventors: Chen-Chao Chang, Hsinchu (TW); Yung-Cheng Lin, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 169 days.

(21) Appl. No.: 13/966,896

(22) Filed: Aug. 14, 2013

(65) Prior Publication Data

US 2014/0269607 A1   Sep. 18, 2014

(30) Foreign Application Priority Data

Mar. 13, 2013   (TW) .............................. 102108787 A

(51) Int. Cl.
*H04W 4/00* (2009.01)
*H04L 5/00* (2006.01)
*H04B 1/10* (2006.01)
*H04B 1/12* (2006.01)

(52) U.S. Cl.
CPC .......... *H04L 5/0062* (2013.01); *H04B 1/1027* (2013.01); *H04B 1/12* (2013.01)

(58) Field of Classification Search
CPC ................ H04B 10/697; H04B 10/695; H04B 10/07955; H04L 25/08; H04L 25/063; H04L 25/064
See application file for complete search history.

(56) References Cited

U.S. PATENT DOCUMENTS

| | | | |
|---|---|---|---|
| 7,349,680 B2* | 3/2008 | Ibrahim et al. ............... | 455/260 |
| 7,580,483 B2* | 8/2009 | Ibrahim et al. ............... | 375/326 |
| 8,112,034 B2* | 2/2012 | Ibrahim et al. ............... | 455/41.2 |
| 8,160,446 B2* | 4/2012 | Collings et al. ............... | 398/83 |
| 2007/0223626 A1 | 9/2007 | Waxman | |
| 2008/0181323 A1 | 7/2008 | Waters et al. | |

OTHER PUBLICATIONS

C. Lélé et al., "Preamble-based channel estimation techniques for OFDM/OQAM over the powerline," Mar. 2007, pp. 59-64.

* cited by examiner

*Primary Examiner* — Brian O'Connor
(74) *Attorney, Agent, or Firm* — Muncy, Geissler, Olds & Lowe, P.C.

(57) ABSTRACT

The present invention provides an electronic device including a coupler, a noise-estimation apparatus and an assembly unit. The coupler receives a baseband signal. The noise-estimation apparatus receives the baseband signal and subtracts a predetermined synchronization preamble from the baseband signal to obtain a noise-estimation signal, and the predetermined synchronization preamble is a transmission signal that conforms to the standards of 802.11bg and/or IEEE 802.11n. The assembly unit receives the baseband signal and subtracts a noise-estimation signal from the baseband signal to obtain an output signal.

7 Claims, 3 Drawing Sheets

ELECTRONIC DEVICE AND NOISE-CANCELLATION METHOD

CROSS REFERENCE TO RELATED APPLICATIONS

This application claims priority of Taiwan Patent Application No. 102108787, filed on Mar. 13, 2013, the entirety of which is incorporated by reference herein.

BACKGROUND OF THE INVENTION

Field of the Invention

The present invention relates to an electronic device, and in particular to an electronic device and a noise cancellation method of eliminating noise interference caused by devices compatible with the USB3.0 standard.

Description of the Related Art

Generally, devices compatible with the USB3.0 standard have been widely used, including laptop computers, desktop computers and all kinds of portable storage devices. However, the operating rate of a device compatible with the USB3.0 standard is 5 Gbps, wherein the baseband frequency is about 2.5 GHz and a background noise of 2.4 GHz to 2.5 GHz is added. Therefore, if the electronic device proceeds to wireless communication with an operating frequency of 2.4 GHz to 2.5 GHz at the same time, such as WiFi or Bluetooth, its signal will experience interference from the high frequency operation of the USB3.0. The increasing noise and the decreasing signal-to-noise ratio (SNR) result in such problems as distortion of the received signal and a decrease of signal flow. Therefore, a new method is needed to eliminate the noise interference caused by the high frequency operation of the USB3.0.

BRIEF SUMMARY OF THE INVENTION

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
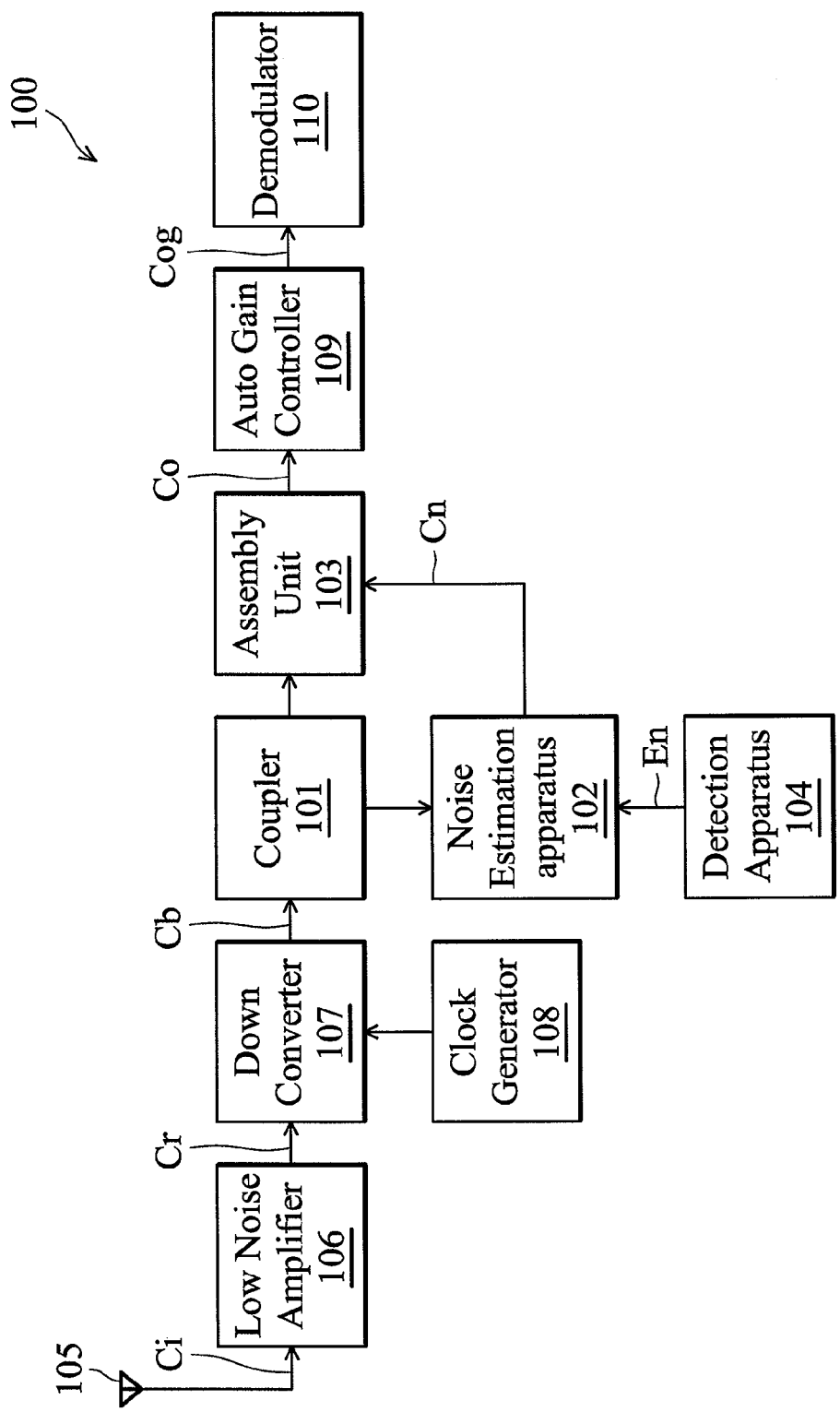
FIG. 1 is a schematic diagram of an electronic device in accordance with an exemplary embodiment.

FIG. 1 is a schematic diagram of an electronic device in accordance with an exemplary embodiment. As shown in FIG. 1, The electronic device 100 includes a coupler 101, a noise-estimation apparatus 102, an assembly unit 103, a detection apparatus 104, an antenna 105, a low noise amplifier (LNA) 106, a down converter 107, a clock generator 108, an auto-gain controller (AGC) 109, and a demodulator 110. Generally, the electronic device 100 can be an electronic apparatus such as a desktop computer, a laptop computer, a server, a router, and so on.

In an embodiment, a second radio frequency (RF) signal Ci is received by the antenna 105 and transmitted to the LNA 106. The LNA 106 receives and amplifies the second RF signal Ci to obtain a first RF signal Cr. Then, the down converter 107 receives the first RF signal Cr and executes the down frequency process to generate a baseband signal Cb. In another embodiment, the down converter 107 is coupled to the clock generator 108 and executes the down frequency process according to the clock generated by the clock generator 108. Specifically, the antenna 105 and the LNA 106 belong to the RF front end. Therefore, the second RF signal Ci and the first RF signal Cr are both signals of radio frequencies. The down converter 107 decreases the frequency of the first RF signal Cr to the frequency band of 100 MHz to 200 MHz to generate the baseband signal Cb. In the embodiment of the present invention, the second RF signal Ci and the first RF signal Cr are RF signals of WiFi communication or Bluetooth communication, but it is not limited thereto.

The coupler 101 is utilized to receive the baseband signal Cb. The noise-estimation apparatus 102 is coupled to the coupler 101 to obtain the baseband signal Cb. In an embodiment, the coupler 101 transmits the received baseband signal Cb to the assembly unit 103 and the noise-estimation apparatus 102. It should be noted that the assembly unit 103 can be an adder or a subtractor. In an embodiment, the assembly unit 103 is an OP amplifier or a mixer. In another embodiment, the noise-estimation apparatus 102 is coupled to the coupler 101 to generate a second baseband signal (not shown) corresponding to the baseband signal Cb. It should be noted that if the amplitude of the baseband signal Cb or the second baseband signal obtained by the noise-estimation apparatus 102 is too small, the noise-estimation apparatus 102 can include an amplifier to amplify the baseband signal Cb or the second baseband signal.

In addition, after the noise-estimation apparatus 102 obtains the baseband signal Cb or the second baseband signal, it subtracts a predetermined synchronization preamble from the baseband signal Cb or the second baseband signal to obtain a noise-estimation signal Cn. It should be noted that the predetermined synchronization preamble conforms to the IEEE 802.11bg standard or the IEEE 802.11n standard. The predetermined synchronization preamble is utilized to synchronize the electronic device 100 and the base station for wireless communication. Specifically, the electronic device 100 utilizes the predetermined synchronization preamble to adjust the transmission frequency, the phase and the clock. The electronic device 100 also utilizes the predetermined synchronization preamble to estimate the power needed to receive signals. Then, the assembly unit 103 receives the noise-estimation signal Cn and subtracts the noise-estimation signal Cn from the baseband signal Cb to obtain an output signal Co. Therefore, now the output signal Co contains almost no noise. Then, the AGC 109 receives the output signal Co to generate an output gain signal Cog to the demodulator 110. The demodulator 110 can be an I/O demodulator. The output gain signal Cog is amplified by the AGC 109 so that the demodulator 110 can demodulate the output gain signal Cog.

In another embodiment, the electronic device 100 further includes a detection apparatus 104 coupled to the noise-estimation apparatus 102. The detection apparatus 104 is utilized to determine whether the electronic device 100 connects to an external device compatible with the USB3.0 standard. When the electronic device 100 is connected to the external device, the detection apparatus 104 transmits an enable signal En to the noise-estimation apparatus 102 so that the noise-estimation apparatus 102 subtracts the predetermined synchronization preamble from the baseband signal Cb to obtain the noise-estimation signal Cn. In other words, only when the noise-estimation apparatus 102 receives the enable signal En, it subtracts the predetermined synchronization preamble from the baseband signal Cb to obtain the noise-estimation signal Cn. Therefore, the power consumption of the electronic device 100 can be saved to improve the operating efficiency. The external device is a mobile electronic device compatible with the USB3.0 standard such as a storage apparatus, a mobile phone, a tablet computer, a laptop computer, and so on.

Figure 2:
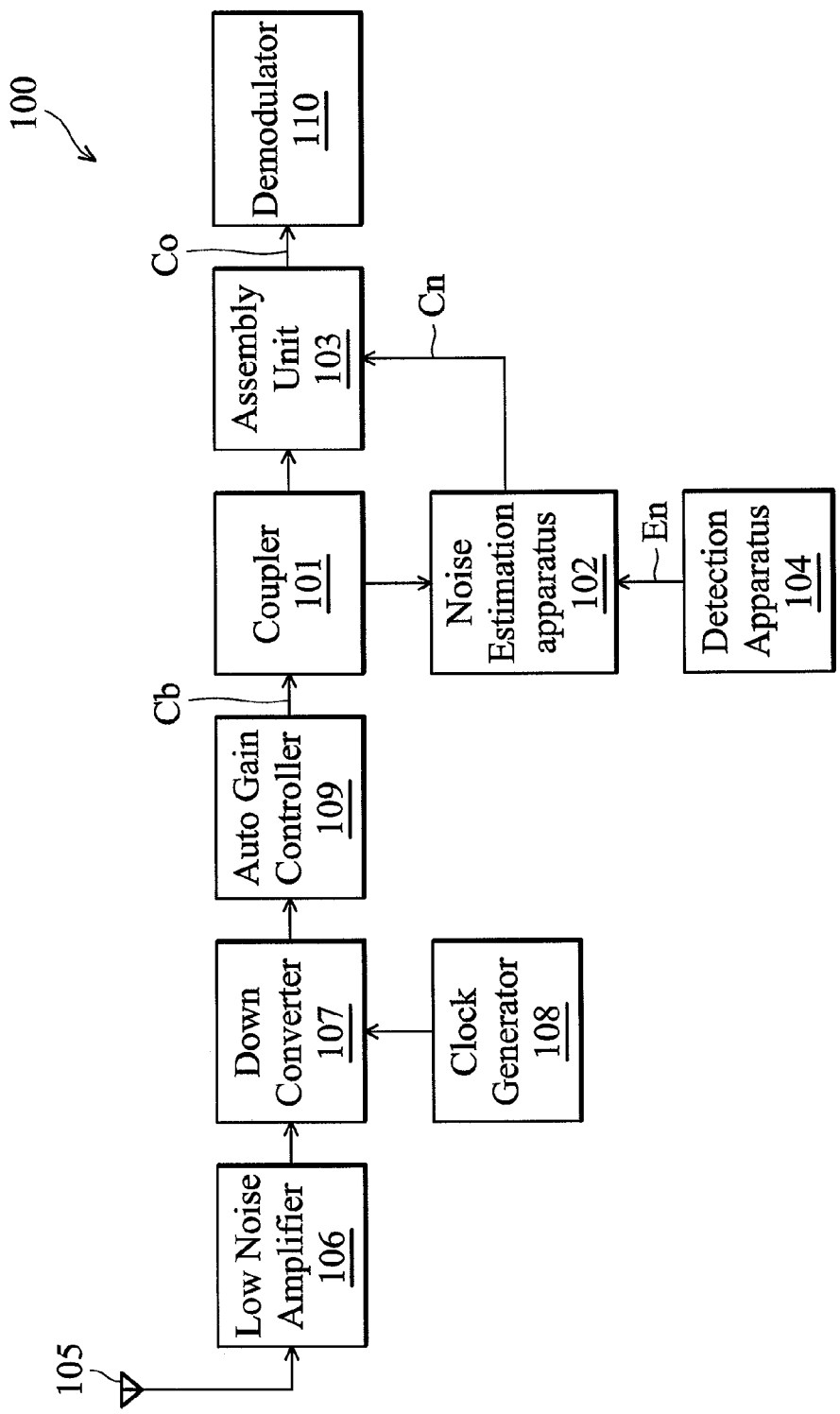
FIG. 2 is a schematic diagram of an electronic device in accordance with another exemplary embodiment.

FIG. 2 is the schematic diagram of an electronic device in accordance with another exemplary embodiment. The difference between FIG. 1 and FIG. 2 is the arrangement of the AGC 109. As shown in FIG. 2, the AGC 109 is arranged between the down converter 107 and the coupler 101. Therefore, the down converter 107 decreases the frequency of the first RF signal Cr to generate a baseband signal. The AGC 109 amplifies the baseband signal generated by the down converter 107 to become the baseband signal Cb. Then, the coupler 101 receives the baseband signal Cb. The following noise-estimation process is described as before, so the details will not be discussed again.

Figure 3:
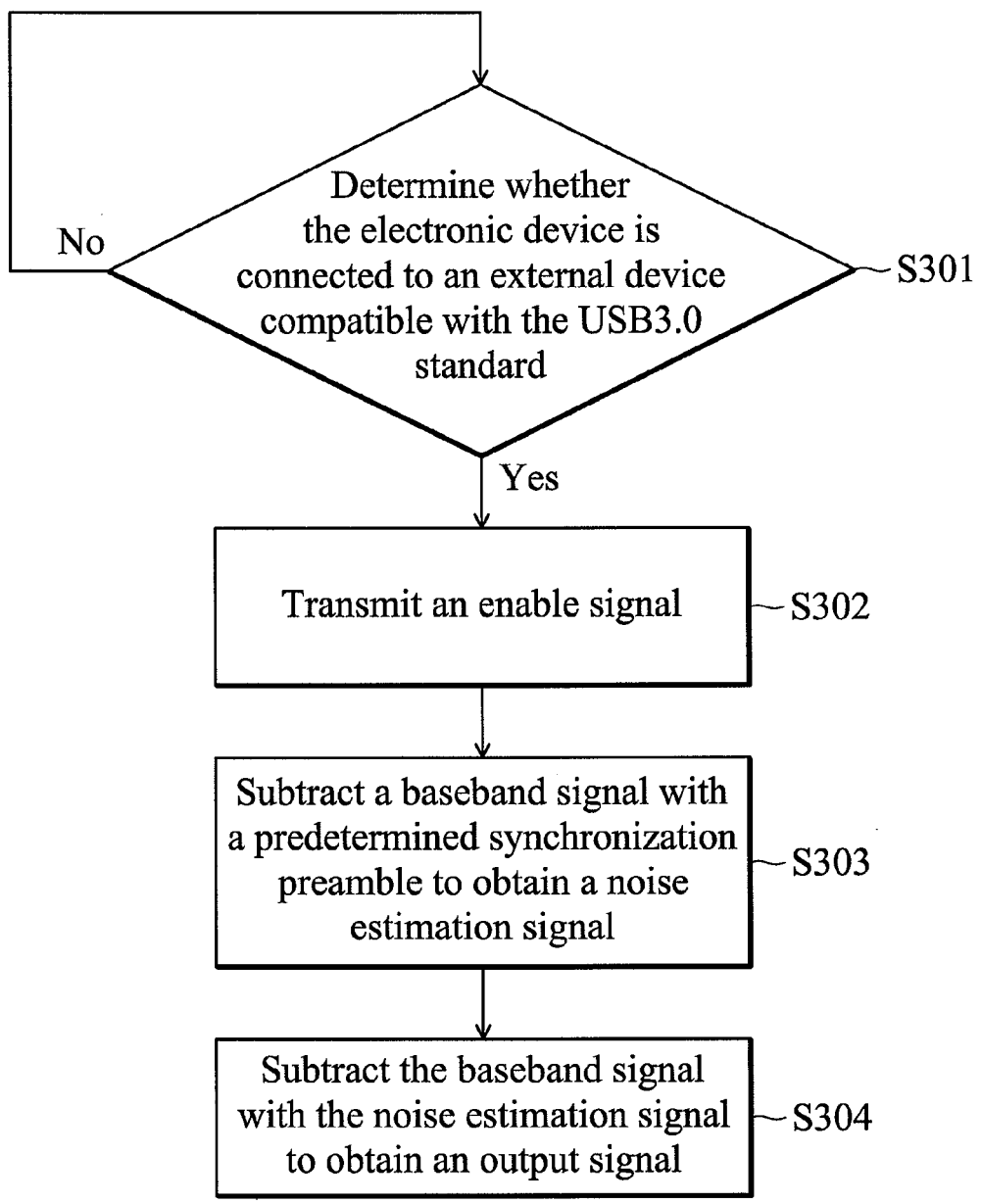
FIG. 3 is a flowchart of a noise cancellation method in accordance with an exemplary embodiment.

FIG. 3 is a flowchart of a noise cancellation method in accordance with an exemplary embodiment. The method can be implemented by the device shown in FIG. 1 or FIG. 2, but it is not limited thereto. In step S301, the detection apparatus 104 determines whether the electronic device 100 is connected to an external device compatible with the USB3.0 standard. If the electronic device 100 is connected to an external device compatible with the USB3.0 standard, then the flowchart proceeds to step S302. If the electronic device 100 is not connected to an external device compatible with the USB3.0 standard, then the flowchart goes back to step S301. In step S302, the detection apparatus 104 transmits an enable signal En to the noise-estimation apparatus 102. In step S303, the noise-estimation apparatus 102 subtracts a predetermined synchronization preamble from a baseband signal Cb to obtain a noise-estimation signal Cn. Finally in step S304, the assembly unit 103 subtracts the noise-estimation signal Cn from the baseband signal Cb to obtain an output signal Co. In the embodiments of the present invention, the baseband signal is generated by decreasing the frequency of an RF signal of WiFi communication or Bluetooth communication, but they are not limited thereto. It should be noted that the predetermined synchronization preamble conforms to the IEEE 802.11bg standard or the IEEE 802.11n standard. The predetermined synchronization preamble is utilized to synchronize the electronic device 100 and the base station for wireless communication. Specifically, the electronic device 100 utilizes the predetermined synchronization preamble to adjust the transmission frequency, the phase and the clock. The electronic device also utilizes the predetermined synchronization preamble to estimate the power needed to receive signals.

It should be noted that the electronic device compatible with the USB3.0 standard is for illustration, and is not meant to be limiting to the invention. Each RF electronic device with an operating frequency of 5 Gbps and/or producing signal interference to other electronic devices is within the scope of the present invention.

The purpose of the present invention is to solve the noise interference caused by high frequency operations of USB3.0. The electronic device of the present invention subtracts a predetermined synchronization preamble from the received baseband signal to obtain a noise-estimation signal. Then, the electronic device subtracts the noise-estimation signal to filter out the noise caused by high frequency operations of the USB3.0. Therefore, the present invention can filter out noise and reduce signal distortion.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a down converter for decreasing the frequency of a first RF signal to generate the baseband signal;
   a coupler, coupled to the down converter, wherein the coupler receives the baseband signal;
   a noise-estimation apparatus, connected to the coupler, wherein the noise-estimation apparatus receives the baseband signal and subtract a predetermined synchronization preamble from the baseband signal to obtain a noise-estimation signal, and the predetermined synchronization preamble conforms to the IEEE 802.11bg standard and/or the IEEE 802.11n standard;
   an assembly unit, connected to the coupler and the noise-estimation apparatus, wherein the assembly unit receives the baseband signal from the coupler and the noise-estimation signal from noise-estimation apparatus and subtracts the noise-estimation signal from the baseband signal to obtain an output signal; and
   a demodulator, coupled to the assembly unit, wherein the assembly unit outputs the output signal to the demodulator without passing through the down converter and the coupler.

2. The electronic device as claimed in claim 1, wherein the assembly unit is an adder or a subtractor.

3. The electronic device as claimed in claim 1, further comprising a detection apparatus determines whether the electronic device is connected to an external device compatible with the USB3.0 standard, wherein when the electronic device is connected to such an external device, the detection apparatus transmits an enable signal to the noise-estimation apparatus so that the noise-estimation apparatus subtracts the predetermined synchronization preamble from the baseband signal to obtain the noise-estimation signal.

4. The electronic device as claimed in claim 1, wherein the predetermined synchronization preamble is embedded within the noise-estimation apparatus.

5. The electronic device as claimed in claim 1, wherein the assembly unit is an OP amplifier or a mixer.

6. The electronic device as claimed in claim 1, further comprising an auto-gain controller coupled to the assembly unit for amplifying the output signal to obtain an output gain signal and outputting the output gain signal to the demodulator.

7. The electronic device as claimed in claim 1, further comprising:

an auto-gain controller, coupled to the coupler for amplifying the first baseband signal to become the baseband signal.

\* \* \* \* \*